United States Patent

[11] 3,552,695

[72] Inventor Gerhard Liesegang
Hamburg, Germany
[21] Appl. No. 765,435
[22] Filed Oct. 7, 1968
[45] Patented Jan. 5, 1971
[73] Assignee Lisega Rohrleitungszubehor G.m.b.H.
Hamburg, Germany

[54] ELASTIC PIPE HANGER
7 Claims, 1 Drawing Fig.

[52] U.S. Cl. ................................................ 248/54, 267/70, 267/173
[51] Int. Cl. ................................................ F16l 3/00
[50] Field of Search ................................... 248/54, 60; 267/172, 173, 70

[56] References Cited
UNITED STATES PATENTS
| | | | |
|---|---|---|---|
| 1,937,135 | 11/1933 | Wood | 248/54 |
| 2,867,399 | 1/1959 | Alexeff | 248/54 |
| 2,949,270 | 8/1960 | Wood | 248/54 |

*Primary Examiner*—Chancellor E. Harris
*Attorney*—Waters, Roditi, Schwartz & Nissen

ABSTRACT: A pipe hanger wherein two toggle levers are symmetrically hinged to a tie bar carrying the pipe and by which a load on the pipe is transmitted to a spring system supported on a fixed abutment, the spring system comprising one or more helical springs arranged parallel and symmetrical with respect to the tie bar and held between a movable upper yoke and a stationary lower yoke. The outer end of each of the toggle levers is connected to the lower pressure yoke through a pivotable drag link whereas the apex of the toggle lever is slidably supported on the upper pressure yoke.

PATENTED JAN 5 1971  3,552,695
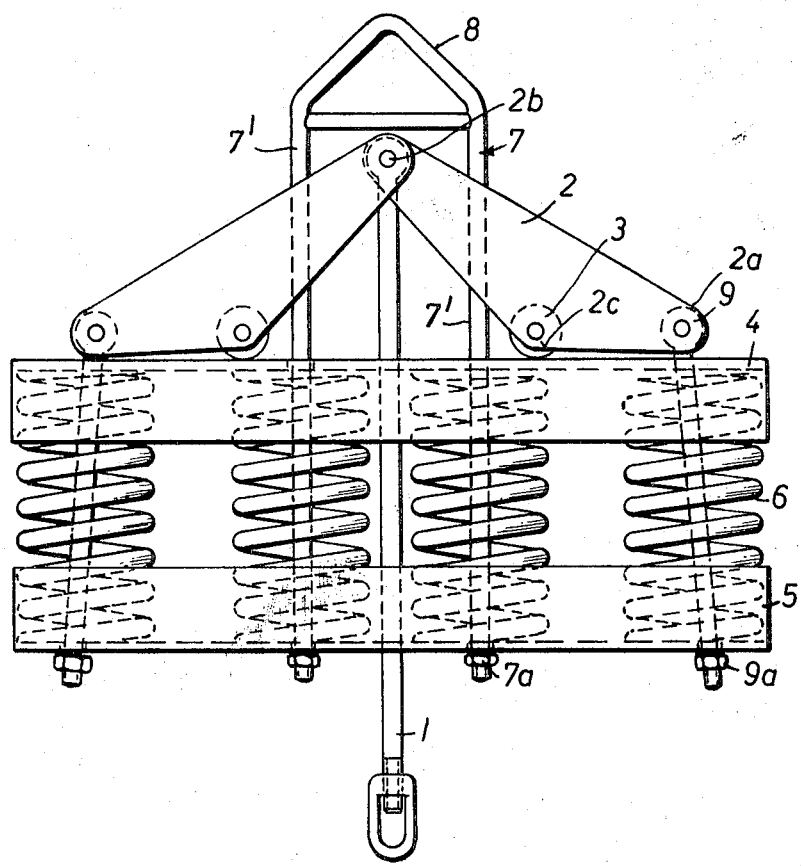

ELASTIC PIPE HANGER

BRIEF SUMMARY OF THE INVENTION

The invention relates to an elastic pipe hanger with a supporting force remaining approximately constant during vertical displacements of the pipe load.

Elastic or spring pipe hangers of this kind are already known, in which two toggle levers are symmetrically attached to a tie bar carrying the pipe through which the weight of the pipe is transmitted to a spring system carried on a fixed abutment.

In one known embodiment, the upper end of a link on each toggle lever is rotatably attached to a fixed bearer, while the lower end is coupled with a sleeve bearing against one end of a horizontally placed spring and slidable on a horizontal rod passing through the spring. Since these levers work as a parallelogram of forces, the supporting effect decreases as their position more closely approaches the horizontal. For this reason, the motion path of the load is restricted by an oblong slot for the pivot suspension of the tie rod in the hanger. The pipe suspension has only a short, working stroke compared with its external, overall dimensions.

In another known embodiment, the tie rod acts directly or through links, on a toggle lever which is fixed at its top end. The other arm of the toggle lever acts directly or through a circular disc segment, on the abutments of horizontally placed springs. The spring force, which is variable owing to the vertical displacement of the pipe, is, in this case, compensated by allowing the hinge point of the tie rod on the toggle lever to describe a circular path around the pivot point thereof, which causes the tie rod to move away from the suspension point of the load. This displacement of the suspension point acts as a disturbing reactive force on the point of attachment of the pipe. If the arrangement is symmetrical, this can be compensated, to some extent, by causing the tie rod to act on the toggle levers through a rocker and link. These arrangements, however, appreciably increase the width of the arrangement.

A particular object of the invention is to provide an elastic pipe suspension with approximately constant supporting force, which is compact in arrangement, by hinging two toggle levers symmetrically to the tie rod carrying the pipe. The invention is characterized in that the spring system consisting of one or more parallel, helical springs arranged symmetrically to the tie rod, is held between a movable upper pressure yoke and a lower, fixed pressure yoke and that the outer end of each toggle lever (the inner end of which is directly hinged to the tie bar) is pivotably coupled, through a drag link with the lower pressure yoke, whereas the apex of each toggle lever is slidably supported on the top pressure yoke.

This results in an elastic pipe suspension system which is of compact and space-saving construction, especially by comparison with the motion path of a rectilinear, vertically guided tie rod suspension. The variable supporting effect of the spring system is compensated by the form of arrangement of the pipe suspension in which the load path increase at the pivot of the spring-supported arm is balanced by the decrease in the path of the applied force at the same pivot point, the spring stroke being utilized as an addition to the load path. The compactness of the pipe suspension system is further enhanced by the possibility of easily using a number of springs in series, which will require less space than only one spring of the same strength.

Suitably, a roller is fitted at the apex of each toggle lever for rolling on the top pressure yoke. The lower pressure yoke can be supported with a suspension stirrup or bridle.

BRIEF DESCRIPTION OF THE DRAWING

The sole figure of the drawing is a side view of an elastic pipe suspension or spring pipe hanger in accordance with the present invention.

DETAILED DESCRIPTION

In the drawing, there is shown an elastic pipe suspension which includes a tie bar 1 from which a pipe can be suspended. The tie bar 1 is vertically displaceable and the suspension is constructed in such a way that the supporting force remains approximately constant during vertical displacement of the pipe. In this respect, two toggle levers 2 are symmetrically attached by a pivot 2b to the upper end of tie bar 1, and a load applied to tie bar 1 is transferred through levers 2 to a spring system 6 which is supported on a fixed abutment 7.

The spring system consists of a number of vertical, helical springs arranged parallel and symmetrical with the tie bar 1 between an upper pressure yoke 4 and a lower pressure yoke 5. The lower pressure yoke 5 is connected to the abutment 7 which is in the form of a suspension stirrup 8. The pressure yoke 5 is supported on nuts 7a secured on arms 7 of the stirrup 8. The outer end 2a of each toggle lever 2 is pivotably connected to a drag link 9 which in turn engages lower pressure yoke 5 by means of nuts 9a screwed on links 9. The apexes 2c of the toggle levers 2, are slidably supported on the upper pressure yoke 4, for which purpose the toggle levers carry associated rollers 3.

When a load is applied to tie bar 1, the pivot 2b is lowered and the toggle levers 2 are displaced, causing yoke 4 to move towards yoke 5 thereby compressing the helical springs. Concurrently, the rollers 3 travel vertically with yoke 4 and laterally outwards thereof, while the levers 2 pivot about links 9 (clockwise at the left side of the drawing and counterclockwise at the right side of the drawing).

The variable spring force of the spring system is compensated by the increasing length of the load path due to the sliding support of the apexes 2c on the pressure yoke 4 and the decreasing length of the force path due to the sliding of the apexes 2c, so that the supporting force for the loading force predetermined by pretensioning of the arrangement, remains substantially constant.

I claim:

1. An elastic pipe hanger comprising a tie bar adapted for supporting a load, elastic means symmetrically disposed with respect to said tie bar for undergoing displacement in a direction parallel to said load, said elastic means comprising a fixed yoke, a displaceable yoke spaced from the fixed yoke and at least two springs engaging said yokes and symmetrically disposed relative to the tie bar, and link means connecting said tie bar and said elastic means, said link means including a pair of toggle elements pivotably connected to said tie bar at a common location, each said toggle element being slidably supported by said displaceable yoke at another location remote from the connection with the tie bar, and a pair of drag links, each being connected to said fixed yoke and pivotably connected to a corresponding toggle element.

2. A hanger as claimed in claim 1 comprising rollers on said toggle elements resting on said displaceable yoke.

3. A hanger as claimed in claim 2 wherein said toggle elements each have opposite ends, one connected to the tie bar and the other to an associated drag link, said roller being located between said ends.

4. A hanger as claimed in claim 3 wherein said tie bar is vertical and said yokes are horizontal, said displaceable yoke being movable vertically relative to the fixed yoke, said rollers being horizontally slidable on said displaceable yoke.

5. A hanger as claimed in claim 1 comprising a suspension stirrup supporting the fixed yoke.

6. A hanger as claimed in claim 5 wherein said drag links pass through respective springs.

7. A hanger as claimed in claim 5 wherein said fixed yoke rests on said stirrup and the drag links.